April 2, 1963 L. E. LANGDON ET AL 3,083,953
GAS DIFFUSION APPARATUS
Filed May 16, 1958 2 Sheets-Sheet 1
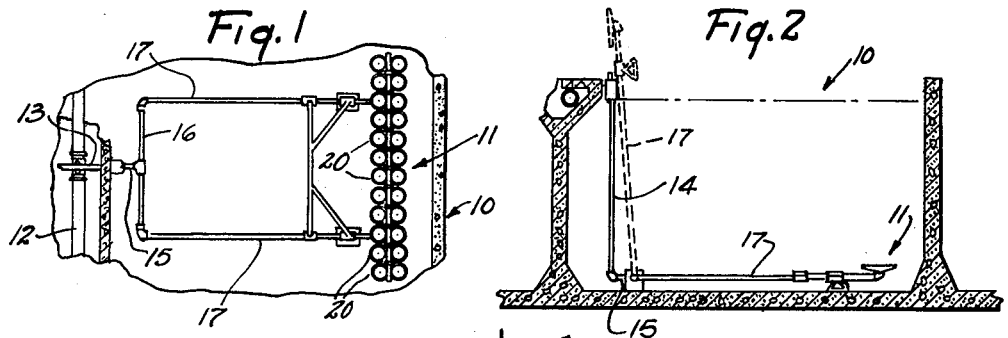
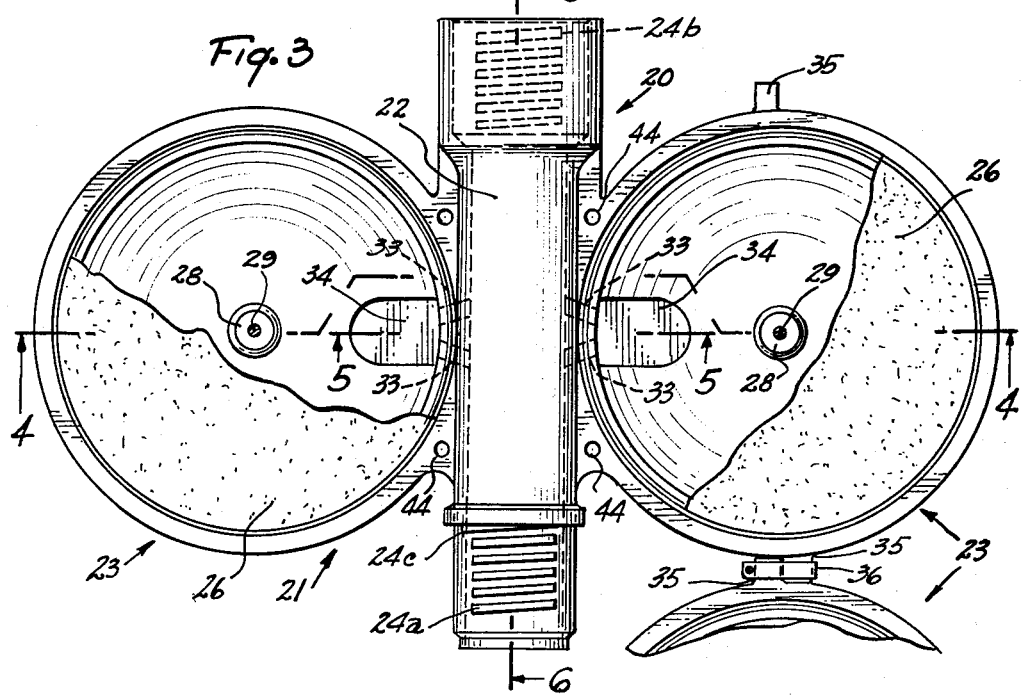
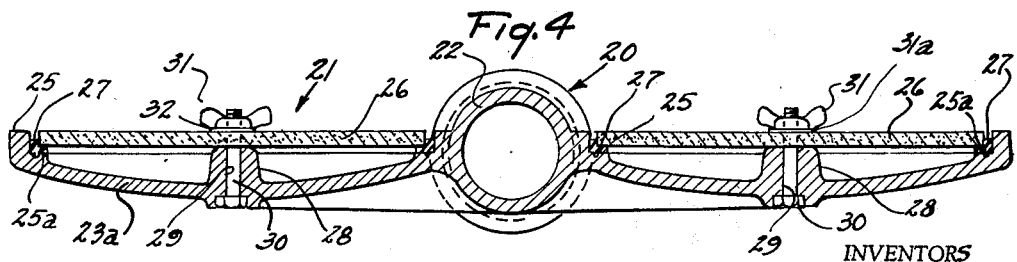
INVENTORS
Lawrence E. Langdon
BY Marion Richard Stiles
Attorneys

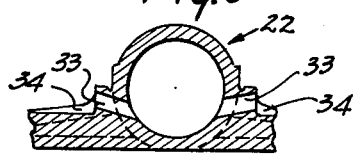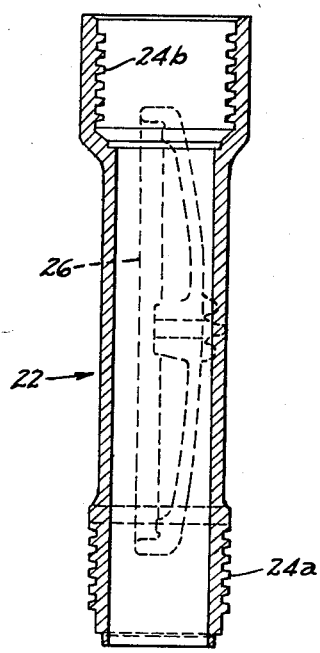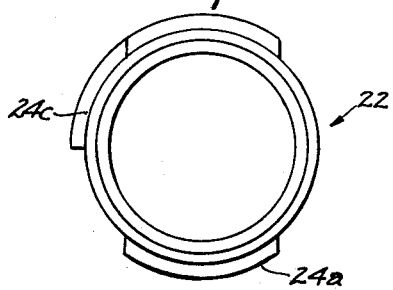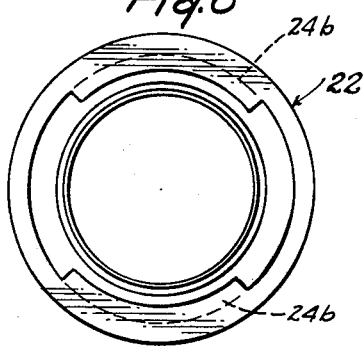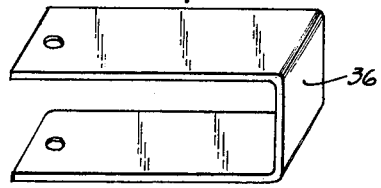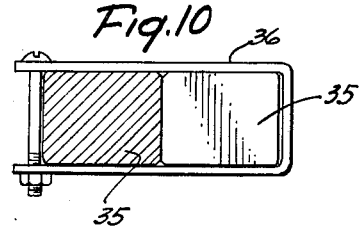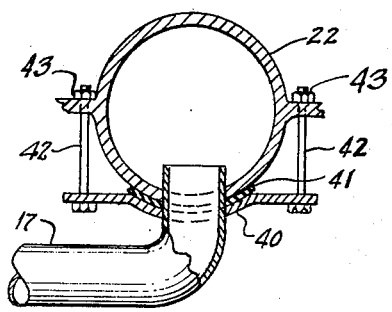

United States Patent Office 3,083,953
Patented Apr. 2, 1963

3,083,953
GAS DIFFUSION APPARATUS
Lawrence E. Langdon, Wilmette, Ill., and Marion Richard Stiles, Sheboygan, Wis., assignors to Pacific Flush Tank Company, Chicago, Ill., a corporation of Illinois
Filed May 16, 1958, Ser. No. 735,884
1 Claim. (Cl. 261—122)

This invention relates to improved gas diffusion apparatus and has to do more particularly with a diffuser head for use in such apparatus. It is an object of the invention to provide improved apparatus of that character.

Gas diffusion apparatus finds many applications and one important application is its use in diffusing air into aeration tanks used in the treatment of sewage in sewage disposal plants. In such tanks air under pressure is diffused into the liquid contents of the tank through diffusers including ceramic elements, generally of plate form, through which elements the air is introduced into the liquid contents, whereby the air flows into the liquid in very finely divided form. The diffuser includes a porous element, generally in the form of a ceramic plate and a holder which is connected to and generally carried by an air inlet pipe, the arrangement being such that the air flows under pressure from the pipe through the ceramic diffuser plate and into the liquid contents of the tank. Generally a number of the plates are arranged in holders carried by an air supply pipe which is normally disposed within the aeration tank. Customarily, the air supply pipes are arranged to be swung out of the material which is in the tank, in order that the ceramic diffuser element can be cleaned or replaced.

The present invention, while capable of general application is particularly applicable to an aeration tank diffuser assembly and pipe unit such as shown in the copending application of Lawrence E. Langdon, Serial No. 592,969, filed June 21, 1956, now Patent No. 2,986,382 and assigned to the assignee of the present application.

Heretofore, ceramic diffuser elements have been of rectangular form (generally square) and held in plate holders by means of four clips or other holding means adjacent the four corners of the plates. The plate holders, heretofore formed of metal, have been carried by elongated pipes or pipe sections, a large number of plate holders being carried by each pipe section with the result that the assembly was of predetermined length and not adapted for change in length to accommodate various types of installations and was comparatively heavy. The securing of the ceramic plates at the four corners makes the job of removing and replacing the plates a rather time-consuming operation. In addition, the securing of rectangular square plates by corner clips often results in breaking the plates, due to unequal forces on the plates when the clips or bolts are tightened.

In accordance with the preferred embodiment of the present invention, the diffuser plate is circular and is supported by a planar circular flange, preferably with a gasket. A single fastening device is employed at the center of the plate. Accordingly when a plate is to be installed or removed only a single fastening device need be operated. This represents a very material saving of labor since large quantities of diffuser plates are necessarily employed in a single sewage aerating plant and since they must frequently be removed for cleaning. Furthermore the circular plate supporting flange may readily be made accurately planar. This, in combination with a single fastening means at the center of the plate, eliminates the sharp stresses which frequently caused breakage in square diffuser plates.

In accordance with the preferred embodiment of the invention the air diffusing apparatus consists of any desired number of integral units with no piping being necessary between units. Each unit consists of two or more plate holders arranged at opposite sides of a length of conduit, the two or more plate holders and the length of conduit being an integral unit. Preferably this unit assembly is molded in one body of a suitable plastic material. Opposite ends of the conduit portion of each unit are arranged for rapid and easy connection to adjacent units. With a succession of such units assembled, each unit serves to conduct air from one adjacent unit to another and at the same time diffuses air through two or more diffuser plates associated with its own plate holders. Each plate holder and its associated diffuser plate form an enclosure which is connected by suitable openings with the interior of the conduit portion forming a part of the integral unit.

Accordingly it is another object of the invention to provide improved gas diffusion apparatus employing gas diffusion plates which may readily and quickly be mounted or dismounted by operation of a single holding means.

It is a further object of the invention to provide improved gas diffusion apparatus in which gas diffusion plates of circular form may be employed and in which sharp stresses in the gas diffusion plates are avoided.

It is still another object of the invention to provide improved gas diffusion apparatus in which integral units, each incorporating two or more diffuser plate holders, may readily and quickly be connected to each other in any desired number without the necessity of intervening piping.

Still another object is to provide a diffuser head assembly including one or more plate holders and plates which is relatively light in weight so that it may readily be removed from the tank in which it is located whenever such removal is desirable.

A further object is to provide a unitary plate holder including a section of conduit and plate holding means carried thereby the conduit section being provided with means for quickly connecting it at either or both ends to the conduit portion of a similar plate holder.

It is a still further object of the invention to provide an integral gas diffusion unit including at least two plate holder portions and a section of conduit, the plate holder portions being connected by passages to the interior of the conduit portion, and the integral unit being readily connectable to other units in succession.

Another object of the invention is to provide improved gas diffusion apparatus having the characteristics defined above wherein the integral units are of molded plastic.

Still another object of the invention is to provide gas diffusion apparatus having characteristics described above while being efficient in operation, durable, and economical to manufacture.

Other objects and advantages of the invention will appear from the following description taken in connection with the appended drawings wherein:

FIGURE 1 is a fragmentary plan view of a sewage aerating tank employing air diffusion apparatus constructed in accordance with the invention;

FIG. 2 is a cross-sectional view of the same tank, further illustrating this application of the invention;

FIG. 3 is a plan view of a diffuser head assembly constructed in accordance with the present invention;

FIG. 4 is a cross-sectional view taken along the line 4—4 of FIG. 3;

FIG. 5 is a fragmentary cross-sectional view taken along the line 5—5 of FIG. 3;

FIG. 6 is a cross-sectional view taken along the line 6—6 of FIG. 3;

FIG. 7 is a view of the externally threaded end of the apparatus;

FIG. 8 is a view of the internally threaded end of the apparatus;

FIG. 9 is a perspective view of a clamp employed in the preferred embodiment of the invention;

FIG. 10 is an elevational view of the clamp of FIG. 9 shown in association with cooperating parts; and FIG. 11 is a cross-sectional view, partially broken away and in section, showing connection of the air diffusion apparatus to an air supply line.

As indicated above, apparatus constructed in accordance with the present invention may find use in various gas diffusion applications. However, it is particularly adapted to use in the aeration of sewage and it is illustrated in the drawings and described herein as employed in this application.

Apparatus illustrating one embodiment of the invention is shown in FIGS. 1 and 2 employed in a sewage aeration tank 10. Air under pressure is brought to a diffuser head assembly 11, constructed according to the present invention, by fixed conduits 12, 13, 14, 15 and 16. Further conduits 17 are employed, these being pivotally connected to the end of the conduit 16 whereby the diffuser head assembly 11 mounted on the free ends of the conduits 17, may be raised pivotally out of the tank without disconnection, as illustrated in FIG. 2 and as more fully described in the aforementioned Langdon application Serial No. 592,969, now Patent No. 2,986,382. It will be understood that one or more additional diffuser head assemblies similar to the assembly 10 may be provided and connected to the pipe 12 in a similar manner, as shown more in detail in the aforementioned Langdon application.

The diffuser head assembly 10 is supported by the conduits 17 which serve also to deliver air to the assembly 10. The assembly 10 includes a plurality of diffuser heads or units 20 which are readily assembled to form the assembly and which may be employed in any desired number, all as explained in detail below. Each diffuser head 20 includes a plate holder 21 and a pair of diffuser plates 26 carried thereby. The plate holder 21 includes a conduit portion 22 of hollow tubular form and a pair of diffuser plate holder portions 23, projecting laterally from the conduit portion 22 on opposite sides thereof. The two plate holder portions 23 and the conduit portion 22 are cast as an integral unit and formed from any suitable material, but preferably of a light, strong, corrosion-resisting material such as various plastic materials. A suitable plastic material for the purpose is the material sold by Plymouth Industrial Products Co. of Sheboygan, Wisconsin, known as "Polyflexon" and comprising a polyethylene with an admixture of asbestos fiber and a bonding resin.

In the illustrated embodiment the conduit portion 22 has external threads 24a at one end and internal threads 24b at its other end in order that a plurality of units may be joined together in alignment to form an assembly having the desired length. Threaded engagement of the conduit portions 22 of successive units not only provides the necessary mechanical connection for the assembly but the joined conduit portions provide a continuous pipe for the flow of air to all such connected units.

Preferably the threads 24a and 24b are interrupted as best illustrated in FIGS. 7 and 8 whereby successive units may be assembled by inserting the externally threaded end of one unit into the internally threaded end of another unit and rotating the two units relative to each other about their mutual axis through an angle of approximately 90°. A gasket (not shown) of suitable soft, resilient, sealing material such as neoprene may be employed to insure a tight seal, which material is inert to the contents of the tank.

The last or innermost external thread 24c may extend circumferentially beyond the other interrupted thread portions, as seen in FIGS. 3 and 7. The last thread 24c is adapted to engage the outer internal thread, upon the insertion of one conduit portion into another and thus halt further inserting movement, with the threads properly aligned to permit relative rotation of the two adjacent conduit portions.

In accordance with the preferred embodiment of the invention, each diffuser plate holder portion 23 has a circular, dished wall 23a and a flange 25 at the periphery thereof formed with an internal shoulder 25a providing an annular seat. The seat 25a lies in a single plane and is employed to support the edges of a diffuser plate 26. A ring gasket 27 of suitable soft material such as neoprene is preferably arranged on the seat 25a to provide a cushion for the peripheral portion of the diffuser plate 26. The flange 25 aids in maintaining the position of the plate 26 and also serves to protect the edges of the plate against damage.

At the center of each plate holder portion 23 an upstanding boss or hub 28 is provided which is of such height that its upper end lies substantially in or slightly below the plane of the seating surface of the gasket 27. A bore 29 extends entirely through the hub 28 and underlying portion of the wall 23a. A bolt 30 extends through the bore 29 and through a central opening in the diffuser plate 26, and in cooperation with a wing nut 31 and washer 32 holds the diffuser plate 26 against the gasket 27. The arrangement is such that the hub supports the central portion of the plate 26 when the latter is in position in the holder and prevents breakage when the wing nut is tightened.

Air under pressure is admitted to the space below the diffuser plate 26, that is, to the enclosure formed by the diffuser plate 26 and the wall 23a of the plate holder 21, one or more openings 33 connecting this enclosure with the interior of the conduit portion 22. In the illustrated embodiment of the invention, the relatively shallow plate holder 21 is cast or molded with a slightly recessed portion 34 to facilitate drilling of the holes 33.

It will now be seen that each plate holder unit includes a conduit portion and a pair of diffuser plate holder portions. The conduit portion conducts air to its own diffuser plate holder portions and to the next adjacent unit or units. Each plate holder portion 23 forms in cooperation with a diffuser plate 26 an enclosure into which air passes from the conduit portion through the openings 33. The air then passes through the diffuser plate in the form of very small air bubbles.

By employing a single, centrally located plate clamping means, assembly of each diffuser plate with its plate holder portion and disassembly therefrom is greatly facilitated. Furthermore, the circular flange 25 in cooperation with the gasket 27 provides a uniform, planar seat for the circular diffuser plate, substantially removed from the single clamping means, such that no sharp stresses are set up in the diffuser plate upon tightening of the clamping means.

Preferably the effective length of the conduit portion 22 is such that edges of the plate holders of successive assembled units lie closely adjacent each other. This provides concentration of the air diffusing apparatus. It also permits bracing of the assembly by mechanical connection between adjacent diffuser plate holders. For this purpose lugs 35 are provided on at least one of the two plate holder portions of each unit. Preferably these lugs are arranged at opposite sides of that center line of the plate holder portion which extends parallel to the conduit portion. Accordingly, the two adjacent lugs of adjacent units lie side by side when the units are in assembled position with the plate holder portions of adjacent units in the same plane as indicated in FIG. 3. A suitable clamp such as the U-shaped clamp 36 shown in FIG. 9 may then be slipped over the side-by-side lugs 35 of adjacent units and clamped in place by a nut and bolt, all as illustrated in FIG. 10. Such clamping of these lugs prevents relative rotation of adjacent plate holders and thus maintains them in the same general plane. This also provides further stability of the assembled units as will readily be recognized by those skilled in the art.

Air under pressure may be supplied by any suitable arrangement to the conduit formed by the several joined conduit portions of assembled units. One practical arrangement is illustrated in FIG. 11. In this figure an upwardly extending portion of the conduit 17, at the free end thereof, is shown protruding through an opening in the bottom of a conduit portion 22. An arcuate flange 40 is secured, as by welding, to the conduit 17 and is shaped to receive the lower surface of the conduit portion 20. Preferably a gasket 41 of suitable soft material such as neoprene is provided to effect a tight seal between the flange 40 and the conduit portion 22. These parts may be held together by two pairs of bolts 42 and associated nuts 43. Each bolt extends through lateral extensions of the arcuate flange 40 as shown in FIG. 11, two bolts being provided at each side of the conduit 17. The bolts may extend upwardly through openings 44 in webs which connect the holders to the conduit portion, such openings 44 being shown in FIG. 3.

As shown in FIG. 1 two conduits 17 are preferably connected thus to the assembled air diffusing units to provide mechanical support for the assembled units and to feed air under pressure thereto. The extreme ends of the conduit portions of an assembled group of plate holder units may be closed respectively with a suitable cap and plug, not illustrated in the drawings, each having interrupted screw threads for attaching them to the ends of the conduit.

It will now be seen that a plurality of individual units may be assembled to provide a group or assembly of any desired number and length. A small group of units may readily be supported and fed by a single supply conduit or a larger group of units may be supported and fed by two or more supply conduits. The units are readily assembled in any desired number. They are easy to handle because of their being integral units of light weight material. The associated circular diffuser plates are readily inserted and removed. The complete apparatus forms a rigid but light assembly such that a relatively large assembly of units may readily be handled as a unit, as for example in removing it from a tank for inspection, cleaning or repair.

It will be apparent that the invention may be varied in its physical embodiment without departing from the spirit of the invention, and it is desired, therefore, that the invention be limited only by the scope of the appended claim.

The invention having thus been described, what is claimed and desired to be secured by Letters Patent is:

In gas diffusion apparatus including a source of gas under pressure and conduit means for conducting such gas to a desired area of diffusion, a plurality of units for conducting and diffusing gas, each of said units including an open-ended conduit portion having quick detachable fastening means including interrupted screw threads at opposite ends thereof for ready connection to adjacent units, a pair of disk-shaped diffuser plate holder portions integral with said conduit portion and extending to opposite sides thereof, and a pair of disk-shaped diffuser plates, each of said holder portions including a continuous, circular flange supporting the edges of a diffuser plate, a single, centrally located plate clamping means engaging the corresponding plate centrally thereof and a wall portion forming an enclosure in cooperation with said diffuser plate, each of said units having a pair of ports leading one each from the interior of said conduit portion to the enclosure formed by said wall portion and the associated diffuser plate of one of said integral holder portions, at least one of said holder portions of each unit having a pair of lugs extending beyond opposite edges thereof at opposite sides of a line extending parallel to and spaced from the axis of the conduit portion thereof and passing substantially through the center of said holder portion with corresponding lugs of adjacent assembled units lying side by side, and clip means engageable with adjacent lugs for locking said lugs together to hold adjacent units against relative movement.

References Cited in the file of this patent

UNITED STATES PATENTS

| | | |
|---|---|---|
| 419,988 | Davis | Jan. 21, 1890 |
| 606,310 | Stretch | June 28, 1898 |
| 2,008,363 | Maris | July 16, 1935 |
| 2,038,451 | Schattaneck | Apr. 21, 1936 |
| 2,328,655 | Lannert | Sept. 7, 1943 |
| 2,346,367 | Durdin | Apr. 11, 1944 |
| 2,359,025 | Durdin | Sept. 26, 1944 |
| 2,639,131 | Coombs | May 19, 1953 |
| 2,673,751 | Finch | Mar. 30, 1954 |
| 2,695,797 | McCarthy | Nov. 30, 1954 |

FOREIGN PATENTS

| | | |
|---|---|---|
| 498,240 | Great Britain | Jan. 5, 1939 |